United States Patent
Matsuo et al.

(10) Patent No.: US 10,697,680 B2
(45) Date of Patent: Jun. 30, 2020

(54) HEAT SOURCE SYSTEM AND CONTROL METHOD THEREOF

(71) Applicant: MITSUBISHI HEAVY INDUSTRIES THERMAL SYSTEMS, LTD., Tokyo (JP)

(72) Inventors: Minoru Matsuo, Tokyo (JP); Takeshi Fuchimoto, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 544 days.

(21) Appl. No.: 14/431,677

(22) PCT Filed: May 31, 2013

(86) PCT No.: PCT/JP2013/065169
§ 371 (c)(1),
(2) Date: Mar. 26, 2015

(87) PCT Pub. No.: WO2014/050213
PCT Pub. Date: Apr. 3, 2014

(65) Prior Publication Data
US 2015/0241100 A1  Aug. 27, 2015

(30) Foreign Application Priority Data
Sep. 27, 2012 (JP) .................. 2012-214504

(51) Int. Cl.
*F25B 49/02* (2006.01)
*F25B 25/00* (2006.01)
(Continued)

(52) U.S. Cl.
CPC ............ *F25B 49/022* (2013.01); *F25B 13/00* (2013.01); *F25B 25/005* (2013.01); *F25B 30/02* (2013.01);
(Continued)

(58) Field of Classification Search
CPC ...... F25B 49/022; F25B 5/04; F25B 2400/06; F25B 2700/21161; F25B 2700/21171
See application file for complete search history.

(56) References Cited

U.S. PATENT DOCUMENTS 4,265,094 A * 5/1981 Haasis, Jr. ............... F24D 17/02
165/163
4,413,478 A * 11/1983 McFarlan ........... F24D 11/0257
165/221
(Continued)

FOREIGN PATENT DOCUMENTS

CN 101529172 A 9/2009
CN 102341656 A 2/2012
(Continued)

OTHER PUBLICATIONS

JP H05-10607 Translation.*
(Continued)

*Primary Examiner* — Nelson J Nieves
(74) *Attorney, Agent, or Firm* — Birch, Stewart, Kolasch & Birch, LLP

(57) ABSTRACT

A heat source system that optimizes a load on compressors in multiple heat source machines with respective independent refrigeration cycles that are situated in series. This is accomplished by using an information acquisition unit that acquires measurement values of operation frequencies of compressors from the respective heat source machines, a load distribution change unit that changes a load distribution currently assigned to each of the heat source machines, and a temperature setting unit that sets the hot/chilled water outlet temperatures of respective heat source machines.

5 Claims, 8 Drawing Sheets

(51) Int. Cl.
*F25B 49/00* (2006.01)
*F25B 13/00* (2006.01)
*F25B 30/02* (2006.01)

(52) U.S. Cl.
CPC .......... *F25B 49/00* (2013.01); *F25B 2400/06* (2013.01); *F25B 2500/05* (2013.01); *F25B 2600/026* (2013.01); *F25B 2600/0253* (2013.01); *F25B 2700/21161* (2013.01); *F25B 2700/21171* (2013.01); *Y02B 30/741* (2013.01)

(56) References Cited

U.S. PATENT DOCUMENTS

| | | | | |
|---|---|---|---|---|
| 4,483,152 A * | 11/1984 | Bitondo | ................. | F25B 49/02 236/1 EA |
| 4,494,006 A * | 1/1985 | Staroselsky | ............... | F02C 6/00 290/4 R |
| 5,875,637 A * | 3/1999 | Paetow | ................... | F25B 1/053 62/117 |
| 6,018,957 A * | 2/2000 | Katra | ...................... | F04B 41/06 62/175 |
| 6,185,946 B1 * | 2/2001 | Hartman | .............. | F04D 15/029 62/175 |
| 7,661,274 B2 * | 2/2010 | Crane | ................... | F25B 49/025 318/67 |
| 2002/0179294 A1 * | 12/2002 | Gupte | ...................... | F25B 1/00 165/159 |
| 2004/0011046 A1 * | 1/2004 | Pierson | ................... | F01K 23/10 60/772 |
| 2004/0016245 A1 * | 1/2004 | Pierson | ................... | F01K 23/10 62/175 |
| 2005/0223724 A1 * | 10/2005 | Crane | ................... | F25B 49/025 62/175 |
| 2007/0252039 A1 * | 11/2007 | Wilmot, Jr. | ............ | B64D 13/06 244/118.5 |
| 2009/0217686 A1 * | 9/2009 | Bittner | ................... | F25D 17/02 62/157 |
| 2010/0058785 A1 * | 3/2010 | Matsuno | ............... | F25B 49/005 62/125 |
| 2010/0094434 A1 * | 4/2010 | Ballet | ...................... | F25B 1/10 700/28 |
| 2010/0107683 A1 * | 5/2010 | MacBain | .................. | F25B 1/00 62/510 |
| 2010/0115984 A1 * | 5/2010 | MacBain | .............. | F25B 29/003 62/434 |
| 2010/0121495 A1 * | 5/2010 | Okoren | ................. | F25B 25/005 700/282 |
| 2011/0146314 A1 * | 6/2011 | Tamura | .................. | F24F 11/008 62/228.5 |
| 2011/0283718 A1 * | 11/2011 | Ueda | ....................... | F25B 1/053 62/79 |
| 2012/0103009 A1 * | 5/2012 | Ding | ........................ | F25B 1/00 62/526 |
| 2013/0125573 A1 | 5/2013 | Nikaido et al. | | |

FOREIGN PATENT DOCUMENTS

| | | |
|---|---|---|
| DE | 26 38 861 A1 | 3/1978 |
| JP | 5-10607 A | 1/1993 |
| JP | 2002-206812 A | 7/2002 |
| JP | 3598357 B2 | 12/2004 |
| JP | 2006-275492 A | 10/2006 |
| JP | 2007-198693 A | 8/2007 |
| JP | 2010-181146 A | 8/2010 |
| JP | 2011-52838 A | 3/2011 |
| JP | 2011-94903 A | 5/2011 |
| JP | 2012-141098 A | 7/2012 |

OTHER PUBLICATIONS

Chinese Office Action dated Nov. 27, 2015 for corresponding Chinese Patent Application No. 201380047913.2 with English Translation.

International Search Report, issued in PCT/JP2013/065169, dated Aug. 20, 2013.

Written Opinion Opinion of the International Searching Authority, issued in PCT/JP2013/065169, dated Aug. 20, 2013.

Japanese Decision to Grant a Patent, dated Nov. 22, 2016, for Japanese Application No. 2012-214504.

Office Action dated Mar. 4, 2019 for corresponding European Patent Application No. 13840931.3.

* cited by examiner

| NUMBER OF OPERATING HEAT SOURCE MACHINES | HEAT SOURCE MACHINE AS OPERATING TARGET | CHANGED LOAD [%] |
|---|---|---|
| 4 | 2a | 30 |
|  | 2b | 26.9 |
|  | 2c | 23.65 |
|  | 2d | 20 |
| 3 | 2b | 38 |
|  | 2c | 34 |
|  | 2d | 28 |

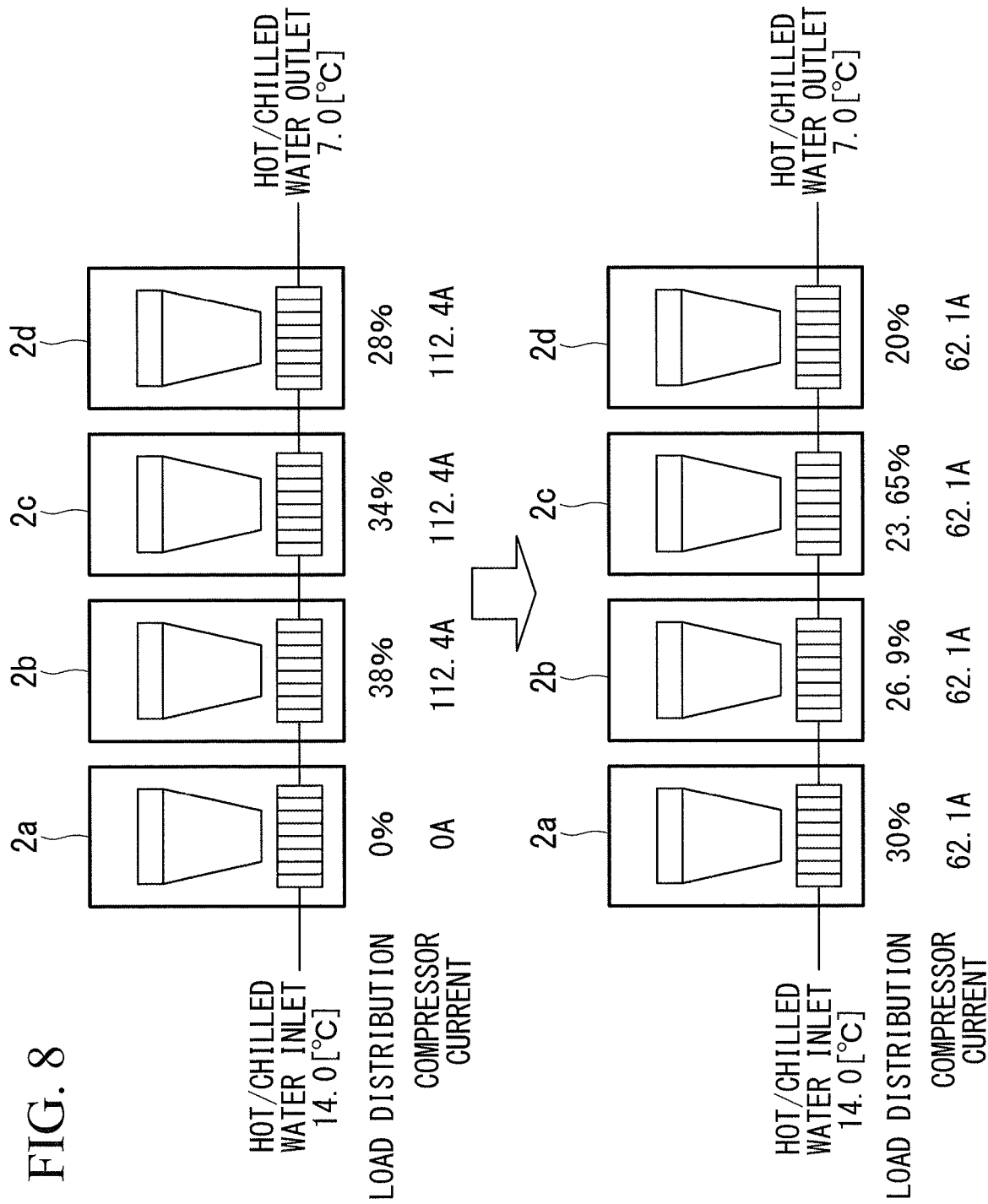

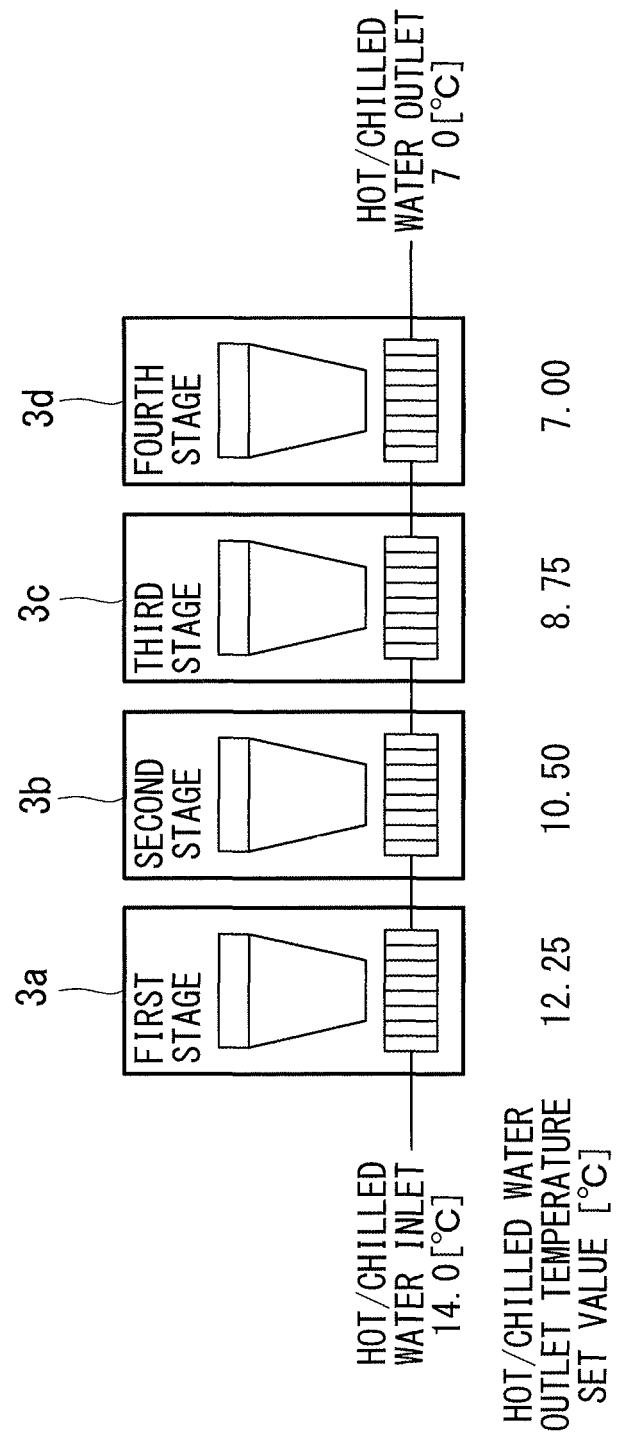

HEAT SOURCE SYSTEM AND CONTROL METHOD THEREOF

TECHNICAL FIELD

The present invention relates to a heat source system and a control method thereof.

BACKGROUND ART

In the related art, there is known a heat source system that connects multiple heat source machines with mutually independent refrigeration cycles in series and performs cooling or heating operation. Since each heat source machine independently performs control, hot/chilled water outlet temperature set values are assigned to the respective heat source machines.

CITATION LIST

Patent Literature

{PTL 1}
Japanese Unexamined Patent Application, Publication No. 2002-206812

SUMMARY OF INVENTION

Technical Problem

As a method of assigning a hot/chilled water outlet temperature set value to each heat source machine, for example, it is considered that the hot/chilled water temperature difference between an inlet and an outlet of a system is simply, equally divided by the number of operating heat source machines and a value obtained by the division assigned to each heat source machine. For example, as illustrated in FIG. 9, in a case where four heat source machines 3a to 3d are connected in series and water (heating medium) of an inlet temperature of 14 [°] is cooled down to 7 [°], 12.25 [°] is set to the first-stage heat source machine 3a located most upstream in a heating medium flow, 10.5 [°] is set to the second-stage heat source machine 3b, 8.75 [°] is set to the third-stage heat source machine 3c and 7 [°] is set to the fourth-stage heat source machine 3d as hot/chilled water outlet temperatures, respectively.

However, as in a case with an air-cooled heat source machine and so on, in a heat source system using the atmosphere and unused heat (sewage, and so on) as a heat source used when a circulating refrigerant heated by heat exchange with a heating medium is cooled in each condenser, heat sources of almost the same temperature are used in four heat source machines. Further, in such a heat source system, when load distribution as mentioned above is performed, there is a problem of bias in the load of a compressor.

For example, while the condensing temperature is substantially the same in all of the heat source machines 3a to 3d, the hot/chilled water outlet temperature set values of respective source machines 3a to 3d sequentially decrease in order from the heat source machine 3a installed in the first stage to the heat source machines 3b, 3c and 3d in subsequent stages (see FIG. 9). Therefore, the speed of the compressor is higher in the heat source machine in a more subsequent stage and the heat source machine operates in a state where the compression ratio is relatively high, which leads to the compressor load bias among the heat source machines. Such compressor load bias causes variation in the length of life among the compressors, which is not preferable. Such variation in the length of life among the compressors cannot be solved by equalization of the operation time of each compressor as disclosed in PTL 1, for example.

The above-mentioned problem similarly occurs even in a case where a heating medium is heated, a load is larger in a compressor in a more subsequent stage, which leads to variation in the length of life among the compressors.

It is an object of the present invention to provide a heat source system that can reduce variation in load among compressors, and a control method thereof.

Solution to Problem

The first aspect of the present invention is a heat source system constituted by connecting multiple heat source machines with respective independent refrigeration cycles in series, including: an information acquisition unit that acquires any one of an operation frequency of a compressor, current consumption of the compressor, power consumption of the compressor and torque of the compressor, from each of the heat source machines; a load distribution change unit that changes a load distribution currently assigned to each of the heat source machines such that values acquired by the information acquisition unit are substantially equal; and a temperature setting unit that sets a hot/chilled water outlet temperature of each of the heat source machines according to the changed load distribution.

According to such a configuration, since the hot/chilled water outlet temperature of each heat source machine is set such that the values of any one of the operation frequencies, current consumption, power consumption and torque of compressors in respective heat source machines are substantially equal, it is possible to reduce variation in the load among the compressors in respective heat source machines.

Information acquired by the above-mentioned information acquisition unit may be a measurement value or may be an estimation value estimated on the basis of the measurement value. For example, in the case of the power consumption and the torque, an estimation value calculated by giving the measurement value of the current consumption to a predetermined operation expression may be used.

In the above-mentioned heat source system, the information acquisition unit may further acquire operation integration time of each of compressors in the heat source machines, and the load distribution change unit may set weighting coefficients based on the operation integration time of each of the compressors and change the load distribution of each of the heat source machines using the weighting coefficients.

Thus, the operation integration time of each of the compressors, in other words, the hot/chilled water outlet temperature of each heat source machine is set taking into account the operation integration time of each of the compressors, and therefore it is possible to further reduce variation in the compressor load among respective heat source machines.

In the above-mentioned heat source system, the load distribution change unit may calculate an average value of the values acquired by the information acquisition unit, compare the average value with the values of the heat source machines acquired by the information acquisition unit, and increase the currently assigned load distribution for the heat source machine whose value is smaller than the average value, and decrease the currently assigned load distribution for the heat source machine whose value is larger than the average value.

By deciding the load distribution in this way, it is possible to achieve the uniformization of compressor loads by easy processing.

The heat source system may include a storage unit that stores load distribution information in which a number of the operating heat source machines, identification information on the heat source machines as operating targets and the changed load distribution of each of the heat source machines are associated with one another, and, at activation or at a change in the number of the operating heat source machines, the temperature setting unit may set a hot/chilled water outlet temperature of each of the heat source machines as the operating targets, based on the load distribution information stored in the storage unit.

Thus, by setting the load distribution of each heat source machine by the use of load distribution information in which the number of operating heat source machines, identification information on the heat source machines as operating targets and changed load distribution of each heat source machine are associated with each other, and by setting the hot/chilled water outlet temperature of each heat source machine on the basis of this load distribution, it is possible to omit arithmetic processing required when the load distribution is set, and it is possible to promptly set the load hot/chilled water outlet temperature.

The second aspect of the present invention is a control method of a heat source system constituted by connecting multiple heat source machines with respective independent refrigeration cycles in series, including the steps of: acquiring any one of an operation frequency of a compressor, current consumption of the compressor, power consumption of the compressor and torque of the compressor, from each of the heat source machines; changing a load distribution currently assigned to each of the heat source machines such that acquired values are substantially equal; and setting a hot/chilled water outlet temperature of each of the heat source machines according to the changed load distribution.

Advantageous Effects of Invention

According to the present invention, an effect that can reduce variation in a length of life among compressors is provided.

BRIEF DESCRIPTION OF DRAWINGS

FIG. 8 is a diagram illustrating one example of load distribution in a case where the number of operating heat source machines changes from three to four.

FIG. 9 is a diagram illustrating load distribution in the related art.

DESCRIPTION OF EMBODIMENTS

First Embodiment

In the following, a heat source system and a control method thereof according to the first embodiment of the present invention are described below with reference to the drawings.

Figure 1:
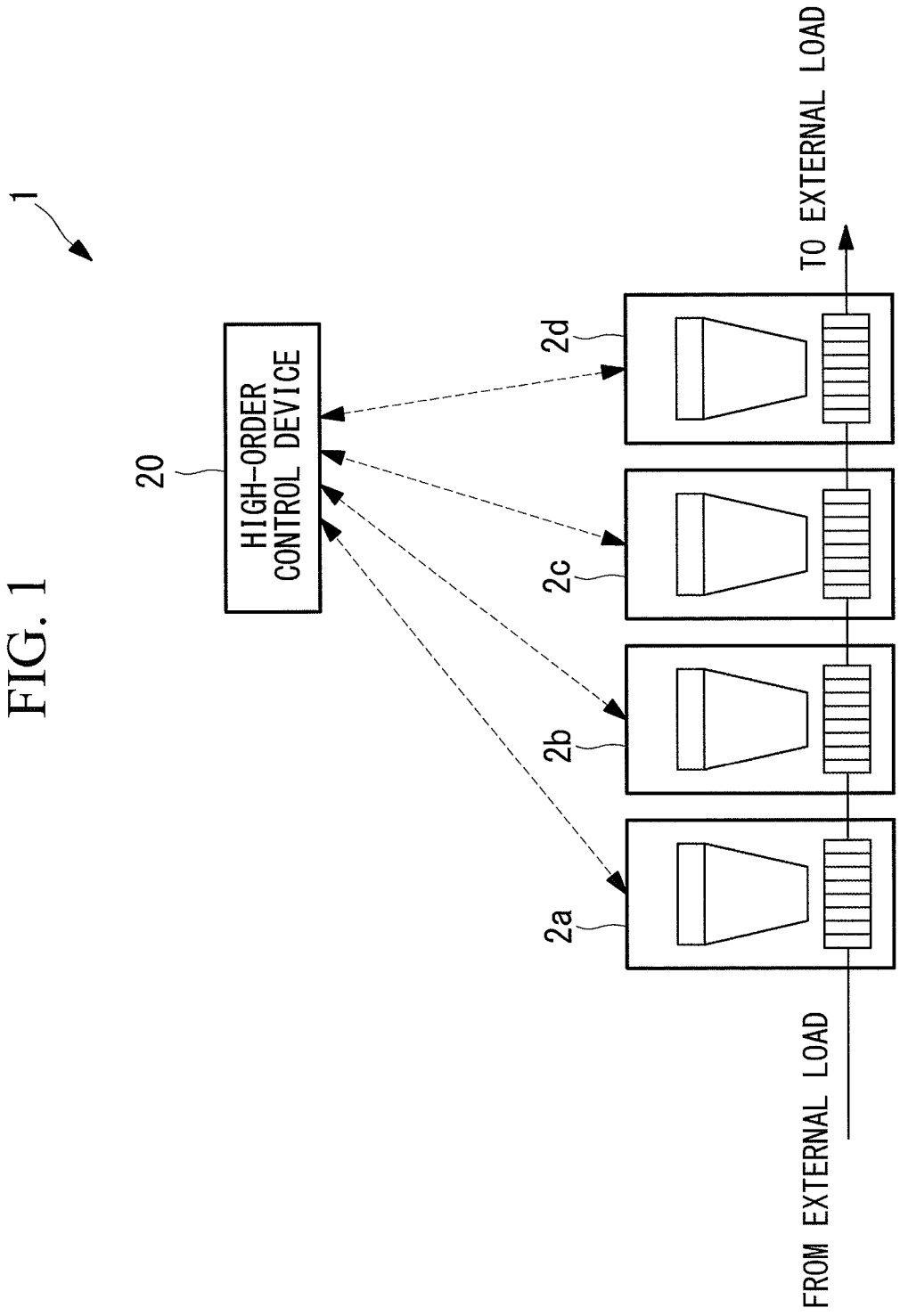
FIG. 1 is a diagram illustrating a schematic configuration of a heat source system according to the first embodiment of the present invention.

FIG. 1 is a diagram illustrating a schematic configuration of a heat source system 1 according to the first embodiment of the present invention. As illustrated in FIG. 1, for example, the heat source system 1 includes: multiple heat source machines 2a to 2d that heat or cool a heating medium (for example, chilled water) supplied to an external load such as an air conditioner, a water heater and an industrial facility; and a high-order control device 20 that gives a control instruction to these heat source machines 2a to 2d. FIG. 1 exemplifies a case where four heat source machines 2a to 2d are installed, but the installation number of heat source machines is not especially limited.

All of the heat source machines 2a to 2d are air-cooled heat source machines and have almost the same performance. The heat source machines 2a to 2d are connected in series, and, for example, in a case where a heating medium is cooled, the heating medium heated by being used in an external load is cooled down to a predetermined hot/chilled water outlet temperature by passing through the heat source machines 2a to 2d, and the cooled heating medium is supplied to the external load.

In a case where the heating medium is heated, the heating medium cooled by being used in the external load is heated up to the predetermined hot/chilled water outlet temperature by passing through the heat source machines 2a to 2d in order, and the heated heating medium is supplied to the external load.

Respective heat source machines 2a to 2d have independent refrigeration cycles respectively. For example, as main components, the refrigeration cycle has: a refrigerant circuit in which a circulating refrigerant circulates; a compressor that compresses a gas refrigerant installed in the refrigerant circuit; a condenser that condenses a high-pressure gas refrigerant compressed by the compressor; an expansion valve that expands a high-pressure liquid refrigerant condensed in the condenser; and an evaporator that evaporates a low-pressure liquid refrigerant expanded by the expansion valve. In a case where the heating medium is cooled, a heating medium heat exchanger that performs heat exchange with the heating medium is the evaporator and an air heat exchanger that performs heat exchange with the atmosphere is a condenser, and the high-pressure gas refrigerant is condensed by heat exchange with the atmosphere in the air heat exchanger after the low-pressure liquid refrigerant that evaporates by the heat of the heating medium in the heating medium heat exchanger is compressed by the compressor.

By contrast with this, in a case where the heating medium is heated, the air heat exchanger that performs heat exchange with the atmosphere is the evaporator and the heating medium heat exchanger that performs heat exchange with the heating medium is the condenser, and the high-pressure gas refrigerant is condensed by heat exchange with the heating medium in the heating medium heat exchanger after the low-pressure liquid refrigerant that evaporates by the heat of the atmosphere in the air heat exchanger is compressed by the compressor. Since the operation of a refrigeration cycle in the case of heating is known, explanation thereof is omitted here.

A case where the heat source system 1 cools the heating medium is described in the following explanation, but the heat source system 1 may have only an ability to heat the heating medium or may have both abilities of cooling and heating.

Figure 2:
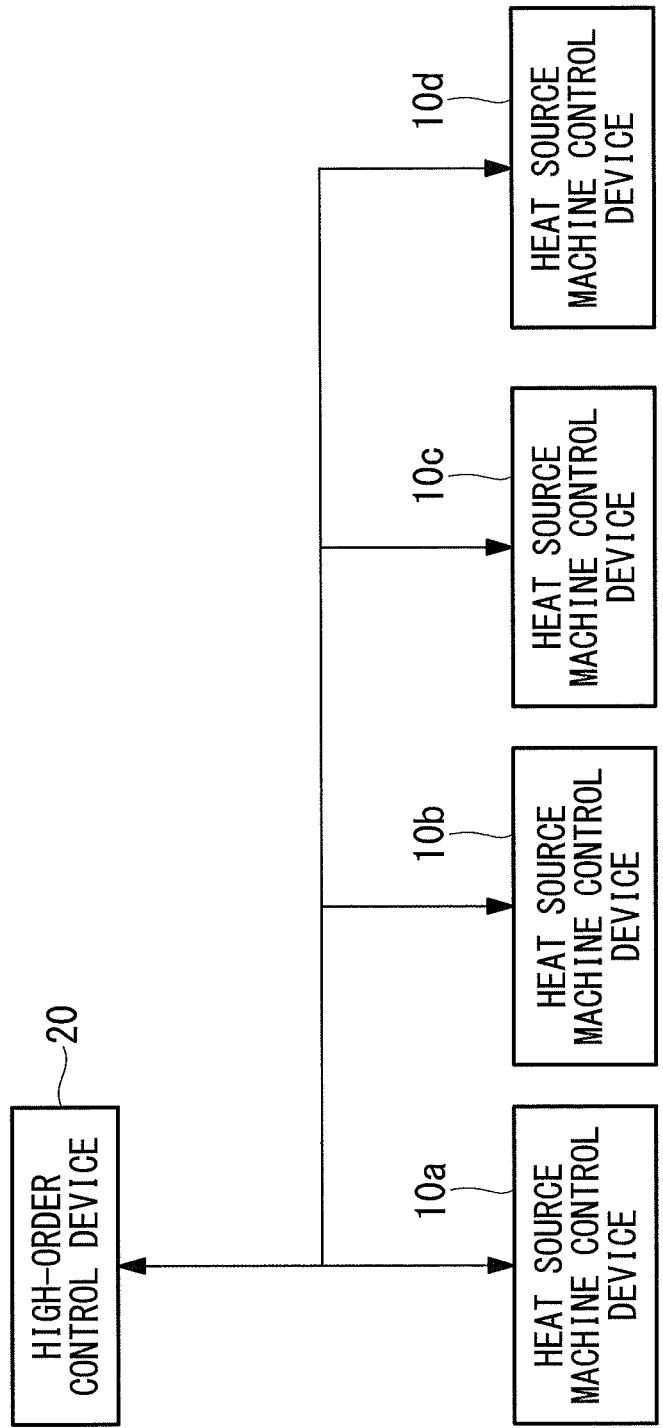
FIG. 2 is a diagram schematically illustrating the configuration of a control system of the heat source system illustrated in FIG. 1.

FIG. 2 is a diagram schematically illustrating the configuration of a control system of the heat source system 1 illustrated in FIG. 1. As illustrated in FIG. 2, the heat source machine control devices 10a to 10d that are control devices of respective heat source machines 2a to 2d are connected with the high-order control device 20 through a communication medium, and are configured so as to be able to perform bidirectional communication. For example, the high-order control device 20 is a control device that controls the whole of the heat source system, and has a function to decide the hot/chilled water outlet temperature set value of each heat source machine described later, and controls the number of heat source machines, and so on. The heat source machine control devices 10a to 10d are installed in respective heat source machines, and control the heat source machines on the basis of a control instruction given from the high-order control device.

For example, the high-order control device 20 and the heat source machine control devices 10a to 10d are computers, and include a main storage device such as a CPU (central processing unit) and a RAM (Random Access Memory), an auxiliary storage device and a communication device that transfers information by performing communication with outside equipment.

The auxiliary storage device is a computer-readable recording medium such as a magnetic disk, a magneto-optical disk, a CD-ROM, a DVD-ROM and a semiconductor memory. This auxiliary storage device stores various programs, and various kinds of processing are realized when the CPU reads and executes the programs in the main storage device from the auxiliary storage device.

Figure 3:
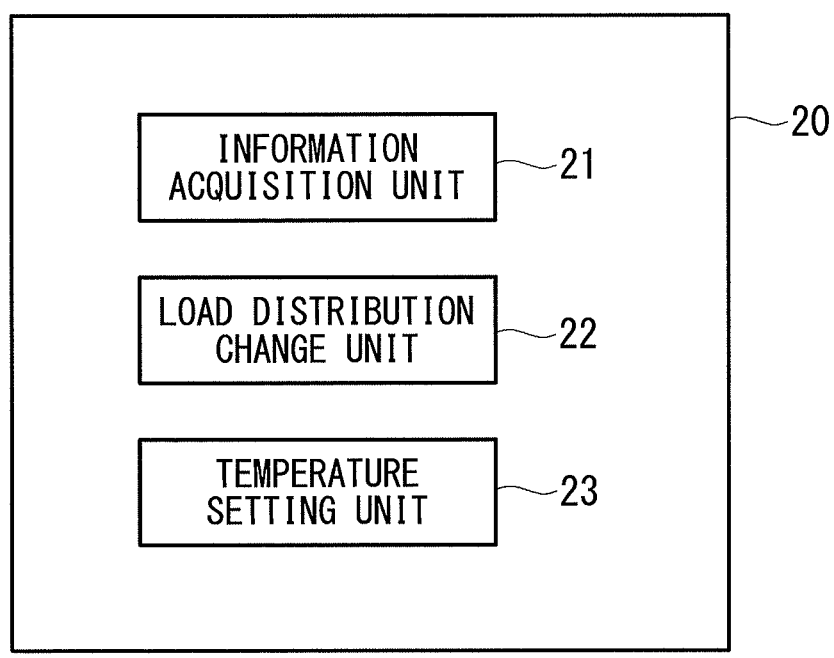
FIG. 3 is a functional block diagram mainly illustrating a function related to the setting of the hot/chilled water outlet temperature of a heat source machine among various control functions included in a high-order control device according to the first embodiment of the present invention.

FIG. 3 is a functional block diagram mainly illustrating a function related to the setting of the hot/chilled water outlet temperature of a heat source machine among various control functions included in the high-order control device 20.

As illustrated in FIG. 3, the high-order control device 20 includes an information acquisition unit 21, a load distribution change unit 22 and a temperature setting unit 23.

The information acquisition unit 21 acquires the operation frequencies of the compressors of respective heat source machines 2a to 2d, which are transmitted from the heat source machine control devices 10a to 10d.

For example, the load distribution change unit 22 equally distributes a load to each heat source machine as the operating target at the time of activation or at the time of a change in the number of operating heat source machines, and, afterward, changes the load distribution of each heat source machine such that the compressor's operation frequency acquired by the information acquisition unit 21 have almost the same the values.

The temperature setting unit 23 sets the hot/chilled water outlet temperature of each heat source machine according to the load distribution decided by the load distribution change unit 22.

Figure 4:
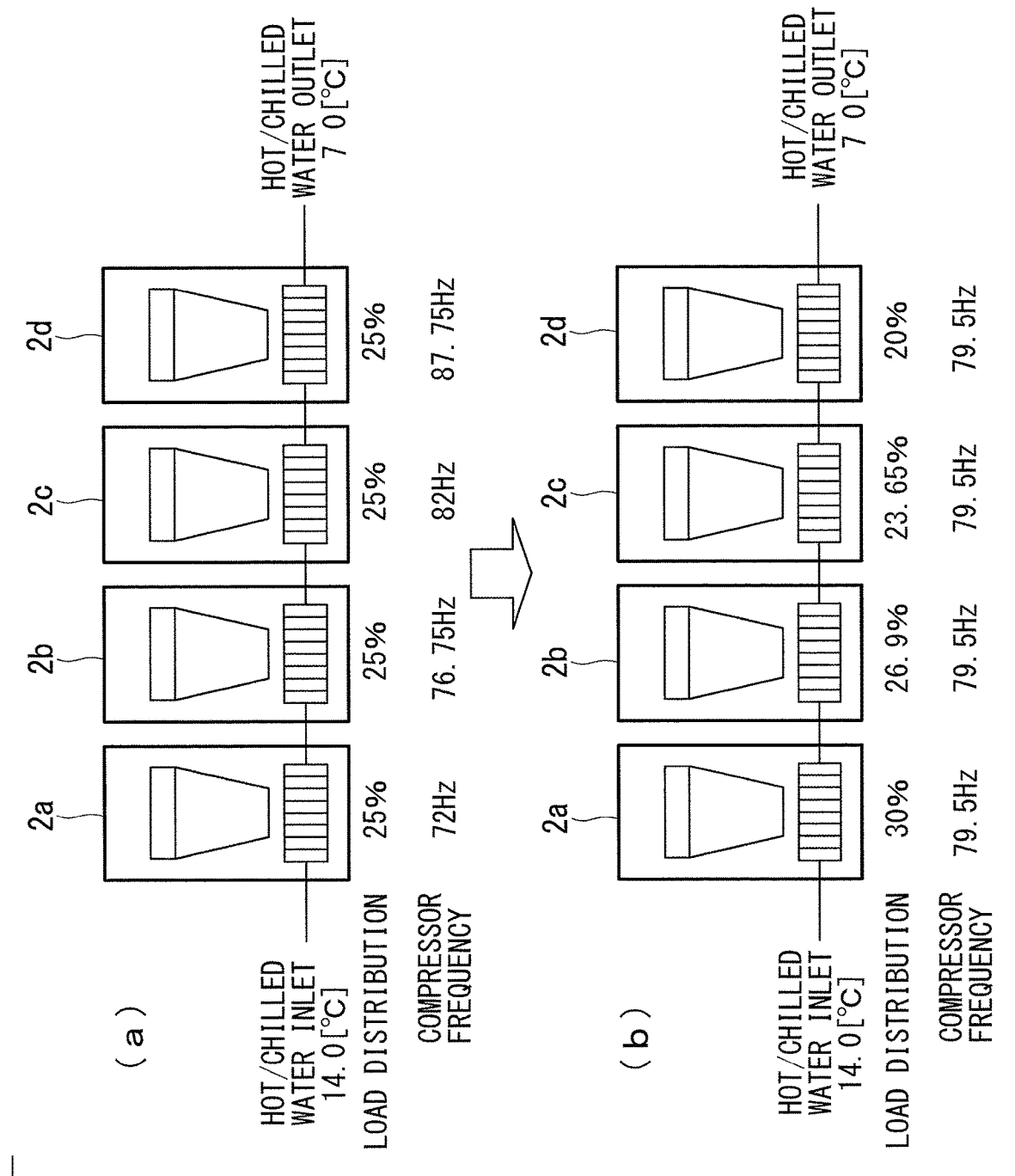
FIG. 4 is a diagram illustrating one example of the appearance before and after the change in load distribution in a case where the load distribution is changed by the use of compressor frequencies.

Next, the operation of the heat source system according to the present embodiment is described with reference to FIGS. 3 and 4. Moreover, in the following, for each of explanation, a case where four heat source machines 2a to 2d are operating and a heating medium of an inlet temperature of 14 [°] is cooled down to 7 [°] in the heat source system 1 and supplied to an external load is described as one example.

For example, when the heat source machines are started or when the number of operating heat source machines changes, the heat source system 1 performs the following processing.

First, the loads of respective heat source machines 2a to 2d that are operating targets are equally set by the load distribution change unit 22 of the high-order control device 20. Consequently, a load of 25% (=100%/4) is assigned to respective heat source machines 2a to 2d.

Next, the hot/chilled water outlet temperatures of respective heat source machines 2a to 2d are set by the temperature setting unit 23, on the basis of an inlet-outlet temperature difference $\Delta T$ of the heat source system 1 and the load distribution assigned to each heat source machine.

Specifically, since the inlet-outlet temperature difference $\Delta T$ in the heat source system 1 is 7 [°]=14 [°]−7 [°], 1.75 [°] is acquired by equally dividing this 7 [°] by four. Subsequently, the hot/chilled water outlet temperature of each heat source machine is decided by subtracting this value of 1.75 [°] from the hot/chilled water inlet temperature of each of the heat source machines 2a to 2d. In a state where a load is equally divided when the hot/chilled water outlet temperature is finally set to 7°, a hot/chilled water outlet temperature of 12.25° is set to the heat source machine 2a, a hot/chilled water outlet temperature of 10.5° is set to the heat source machine 2b, a hot/chilled water outlet temperature of 8.75° is set to the heat source machine 2c, and a hot/chilled water outlet temperature of 7° is set to the heat source machine 2d.

When the hot/chilled water outlet temperatures with respect to respective heat source machines 2a to 2d are decided in this way, the hot/chilled water outlet temperature set values are transmitted to respective heat source machine control devices 10a to 10d from the high-order control device 20. The heat source machine control devices 10a to 10d of respective heat source machines control compressors, and so on, on the basis of the received hot/chilled water outlet temperature set values.

Subsequently, while operation based on the hot/chilled water outlet temperature set values received from the high-order control device 20 is performed, the heat source machine control devices 10a to 10d transmits the operation frequencies of respective present compressors to the high-order control device 20.

In the high-order control device 20, the operation frequencies of compressors from respective heat source machine control devices 10a to 10d are received by the information acquisition unit 21, and are output to the load distribution change unit 22.

When the operation frequencies of respective compressors are input, the load distribution change unit 22 calculates the average value of these values. For example, as illustrated in FIG. 4(a), in a case where the compressor frequency of the heat source machine 2a is 72 [Hz], the compressor frequency of the heat source machine 2b is 76.75 [Hz], the compressor frequency of the heat source machine 2c is 82 [Hz] and the compressor frequency of the heat source machine 2d is 87.75 [Hz], the average value of the compressor frequencies of these four machines is 79.5 [Hz].

Subsequently, this average value 79.5 [Hz] and the compressor frequencies of respective heat source machines are compared, and the currently set load distribution of a heat source machine is increased for the heat source machine whose compressor frequency is lower than the average value, while the currently set load distribution of a heat source machine is decreased for the heat source machine whose compressor frequency is higher than the average value. Consequently, the load distribution is set larger for the heat source machines 2a and 2b, and the load distribution is set larger for the heat source machines 2a and 2b.

At this time, regarding a specific method of setting the load distribution, for example, the following methods are considered.

For example, when values before the change of load distribution with respect to respective heat source machines 2a, 2b, 2c and 2d are assumed to be α, β, γ and δ ($\alpha+\beta+\gamma+\delta=1$) respectively and the results of PI calculation with respect to a deviation with respect to the average value of the compressor frequencies of respective heat source machines are assumed to be Δα, Δβ, Δγ and Δδ, results Δα and Δβ of PI calculation with respect to the heat source machines 2a and 2b become positive values, and results Δγ and Δδ of PI calculation with respect to the heat source machines 2c and 2d become negative values. Here, since $\alpha+\Delta\alpha+\beta+\Delta\beta+\gamma+\Delta\gamma+\delta+\Delta\delta=1$ is not necessarily established, the load distribution after the change of respective heat source machines is calculated as follows.

Heat source machine 2a: $\alpha'=(\alpha+\Delta\alpha)/(\alpha+\Delta\alpha+\beta+\Delta\beta+\gamma+\Delta\gamma+\delta+\Delta\delta)$ Heat source machine 2b: $\beta'=(\beta+\Delta\beta)/(\alpha+\Delta\alpha+\beta+\Delta\beta+\gamma+\Delta\gamma+\delta+\Delta\delta)$ Heat source machine 2c: $\gamma'=(\gamma+\Delta\gamma)/(\alpha+\Delta\alpha+\beta+\Delta\beta+\gamma+\Delta\gamma+\delta+\Delta\delta)$ Heat source machine 2d: $\delta'=(\delta+\Delta\delta)/(\alpha+\Delta\alpha+\beta+\Delta\beta+\gamma+\Delta\gamma+\delta+\Delta\delta)$ Consequently, $\alpha'+\beta'+\gamma'+\delta'=1$ is established, and, by setting the hot/chilled water outlet temperature set value transmitted to each heat source machine as 7°×load distribution rate (corresponding to each heat source machine among α', β', γ' and δ') that is the result of each hot/chilled temperate water inlet temperature–rated temperature difference, the hot/chilled water outlet temperature setting according to the changed load distribution is decided.

The above-mentioned load distribution setting method is not limited to the above-mentioned specific example, and other methods can be arbitrarily used.

Thus, when the load distribution of the heat source machines is changed by the load distribution change unit 22, the temperature setting unit 23 sets the hot/chilled water outlet temperatures of respective heat source machines 2a to 2d on the basis of the changed load distribution. Further, when the newly set hot/chilled water outlet temperatures of respective heat source machines are transmitted to respective heat source machine control devices 10a to 10d, compressor control, and so on, based on the changed hot/chilled water outlet temperature set values is performed. Consequently, for example, as illustrated in FIG. 4(b), it is possible to reduce variation in compressor frequency among the heat source machines and make the compressor loads substantially equal.

As described above, according to the heat source system 1 according to the present embodiment, the load distribution of respective heat source machines 2a to 2d is decided such that the compressor frequencies of the heat source machines have substantially the same values. Therefore, even if heat sources subjected to heat exchange with a circulation refrigerant that circulates in a refrigeration circuit are the ones whose temperature cannot be adjusted, it is possible to reduce variation in compressor load among the heat source machines. Consequently, it is possible to suppress variation in the length of life among the compressors.

The load distribution has been decided on the basis of compressor frequencies in the present embodiment, but it may be possible to use the operation integration time of each compressor in addition to the compression frequencies. In this case, for example, each of the heat source machines 2a to 2d is allowed to have a function to monitor the operation integration time of the compressor, and the operation integration time of the compressor is also transmitted at the timing the above-mentioned compression frequency is transmitted to the high-order control device 20. Consequently, the compression frequency and the operation integration time in each heat source machine are received by the information acquisition unit 21.

When receiving these compressor frequency and operation integration time, by a method similar to the above, the load distribution change unit 22 sets the load distribution of each heat source machine on the basis of the compressor frequency.

Subsequently, the load distribution change unit 22 calculates the weighting coefficient based on the operation integration time of each compressor, by the use of a weighting coefficient operation expression which is held in advance and includes the operation integration time as a parameter. Here, the weighting coefficient operation expression is created such that the weighting coefficient has a smaller value as the operation integration time is longer.

The load distribution change unit 22 sets load distribution that reflects the operation integration time, by multiplying the load distribution set beforehand by this weighting coefficient. Further, the hot/chilled water outlet temperature of each heat source machine is set by the temperature setting unit 23 on the basis of this load distribution.

Thus, by reflecting the operation integration time, it is possible to further reduce variation in load among the compressors.

The load distribution has been decided on the basis of the compressor frequencies of heat source machines that are operating targets in the present embodiment, but, for example, the load distribution and hot/chilled water outlet temperature of each heat source machine may be set using any one of compressor current consumption, compressor power consumption and compressor torque, and so on. Information to be acquired at this time may be a measurement value or may be an estimation value calculated by operation. For example, the measurement value may be used for the compressor current consumption, and the measurement value or the estimation value may be used for the compressor power consumption. The estimation value of the compressor power consumption can be estimated by inputting the measurement value of the compressor current consumption in a predetermined operation expression. As for the compressor torque, it may be possible to use the estimation value estimated by inputting the measurement value of the compressor current consumption in the predetermined operation expression.

Figure 5:
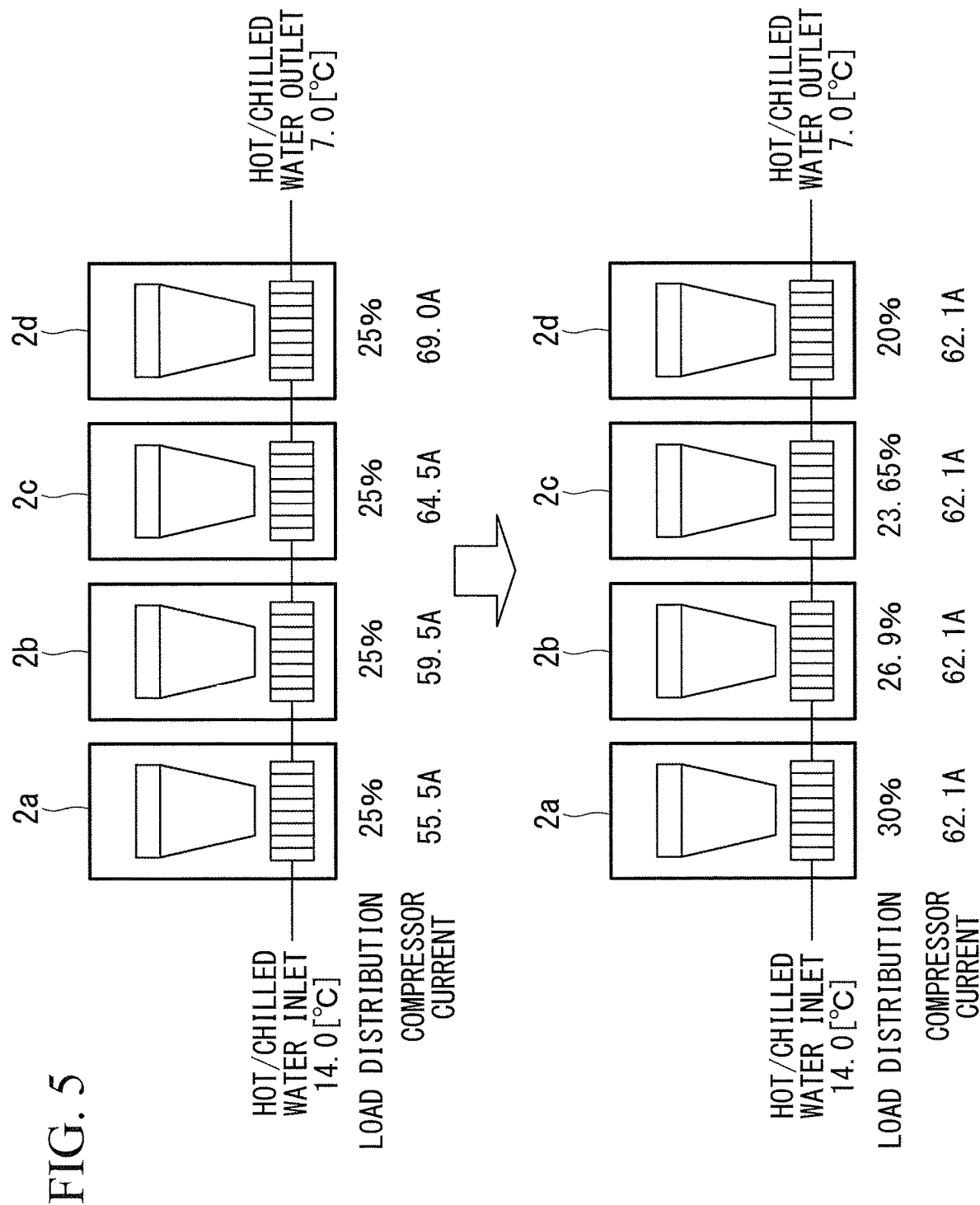
FIG. 5 is a diagram illustrating one example of the appearance before and after the change in load distribution in a case where the load distribution is changed by the use of a compressor current.

FIG. 5 is a diagram illustrating one example of the appearance before and after the change in load distribution in a case where the load distribution is changed using the compressor current. In a case where the compressor current is used, the load distribution of each heat source machine is changed such that respective compressor currents have substantially the same values.

Thus, by setting the load distribution and hot/chilled water outlet temperature of each of the heat source machines 2a to 2d on the basis of any one of the compressor current, the power consumption and the compressor torque, it is possible to directly see compressor loads as compared with a case where compressor frequencies are used. Consequently, as compared with a case where the compressor frequencies are used, it is possible to understand the compressor loads at high accuracy, and it is possible to suppress variation in load among the compressors at higher accuracy.

Second Embodiment

Figures 6, 7:
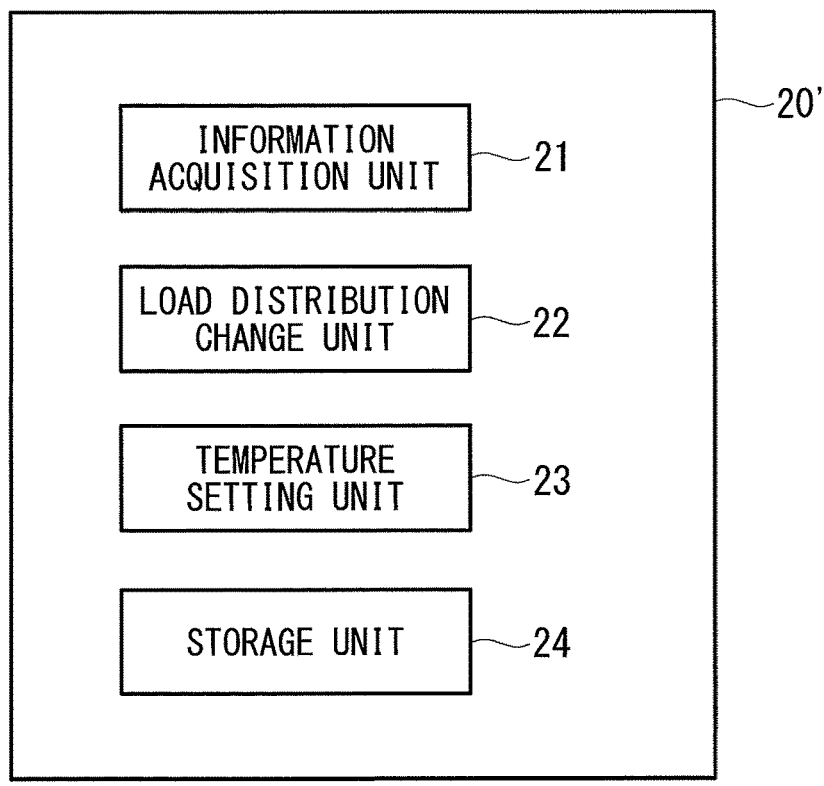
FIG. 6 is a functional block diagram mainly illustrating a function related to the setting of the hot/chilled water outlet temperature of a heat source machine among various control functions included in a high-order control device according to the second embodiment of the present invention.
FIG. 7 is a diagram illustrating one example of load distribution information.

Next, the second embodiment of the present invention is described. FIG. 6 is a functional block diagram mainly illustrating a function related to the setting of the hot/chilled water outlet temperature of a heat source machine among various control functions included in a high-order control device in the present embodiment. As illustrated in FIG. 6, a high-order control device 20' in the present embodiment is different from the above-mentioned first embodiment in that, in a case where load distribution is changed by the load distribution change unit 22, a storage unit 24 that stores the information as load distribution information is further included.

FIG. 7 is a diagram illustrating one example of load distribution information. As illustrated in FIG. 7, in the load distribution information, the number of operating heat source machines, identification information of heat source machines as operating targets and changed load distribution of respective heat source machines are associated with each other. Thus, by storing the load distribution information, it is possible to promptly set the hot/chilled water outlet temperature.

For example, as illustrated in FIG. 8, in a case where the number of operating heat source machines changes from three to four, the load distribution change unit 22 refers to the load distribution information stored in the storage unit 24 and retrieves whether corresponding information is registered. In a case where information on four operation machines is registered, the information is read and output to the temperature setting unit 23. As a result, for example, 30 [%] is output as load distribution for the heat source machine 2a, 26.9 [%] is output as load distribution for the heat source machine 2b, 23.65 [%] is output as load distribution for the heat source machine 2c, and 20 [%] is output as load distribution for the heat source machine 2d.

The temperature setting unit 23 sets the hot/chilled water outlet temperature of each heat source machine on the basis of this load distribution, and this hot/chilled water outlet temperature is transmitted to each of the heat source machine control devices 10a to 10d.

By contrast with this, in a case where the corresponding load distribution information is not registered in the storage unit 24, similar to the above-mentioned first embodiment, the load distribution change unit 22 sets the load distribution of each heat source machine on the basis of a compressor frequency and outputs this load distribution to the temperature setting unit 23. Moreover, the load distribution change unit 22 creates load distribution information on this load distribution and stores the load distribution information in a storage unit 25.

As mentioned above, according to the heat source system according to the present embodiment, it is possible to reduce the load of arithmetic processing in the load distribution change unit 22 by storing load distribution information in the storage unit 24. Therefore, it is possible to promptly set an appropriate hot/chilled water outlet temperature according to a compressor load.

Similarly, a case where a heating medium is cooled has been described as one example in the above-mentioned first or second embodiment, the present invention is not limited to this aspect, and it is also applicable to a case where the heating medium is heated.

The high-order control devices 20 and 20' set the hot/chilled water outlet temperatures of respective heat source machines 2a to 2d in the present embodiment, but, for example, any of the heat source machine control devices 10a to 10d may be set as a master in place of the high-order control devices 20 and 20', and the heat source machine control device defined as the master may acquire information from the other heat source machine control devices and set the hot/chilled water outlet temperatures of respective heat source machines 2a to 2d.

REFERENCE SIGNS LIST

1 Heat source system
2a to 2d Heat source machine
10a to 10d Heat source machine control device
20, 20' High-order control device
21 Information acquisition unit
22 Load distribution change unit
23 Temperature setting unit
24 storage unit

The invention claimed is:

1. A heat source system constituted by connecting multiple heat source machines with respective independent refrigeration cycles in series, comprising:
   a processor configured to perform the functions of:
   an information acquisition unit that acquires, from the heat source machines on which a load is equally distributed, values of any one of an operation frequency of a compressor, current consumption of the compressor, power consumption of the compressor and torque of the compressor, each of which relates to an operation state;
   a load distribution change unit that calculates an average value of the values acquired by the information acquisition unit and changes a load distribution currently assigned equally to each of the heat source machines such that the operation state in each of the heat source machines approaches the average value; and
   a temperature setting unit that sets a hot/chilled water outlet temperature of each of the heat source machines according to the changed load distribution.

2. The heat source system according to claim 1, wherein the information acquisition unit further acquires operation integration time of each of compressors in the heat source machines; and
   the load distribution change unit sets weighting coefficients based on the operation integration time of each of the compressors and changes the load distribution of each of the heat source machines using the weighting coefficients.

3. The heat source system according to claim 1, wherein the load distribution change unit
- compares the average value with the values of the heat source machines acquired by the information acquisition unit; and
- increases the currently assigned load distribution for the heat source machine whose value is smaller than the average value, and decreases the currently assigned load distribution for the heat source machine whose value is larger than the average value.

4. The heat source system according to claim 1, further comprising a storage unit that when the load distribution is changed by the load distribution change unit, stores, as information about load distribution, load distribution information in which a one or more of the operating heat source machines, identification information on the heat source machines as operating targets and the changed load distribution of each of the heat source machines are associated with one another,
- wherein, at activation or at a change in the number of the operating heat source machines, the temperature setting unit sets a hot/chilled water outlet temperature of each of the heat source machines as the operating targets, based on the load distribution information stored in the storage unit.

5. A control method of a heat source system constituted by connecting multiple heat source machines with respective independent refrigeration cycles in series, comprising the steps of:
- acquiring, from the heat source machines on which a load is equally distributed, values of any one of an operation frequency of a compressor, current consumption of the compressor, power consumption of the compressor and torque of the compressor, each of which relates to an operation state;
- calculating an average value of the values acquired;
- changing a load distribution currently assigned equally to each of the heat source machines such that the operation state in each of the heat source machines approaches the average value; and
- setting a hot/chilled water outlet temperature of each of the heat source machines according to the changed load distribution.

* * * * *